United States Patent [19]

Hackman et al.

[11] Patent Number: 4,593,885

[45] Date of Patent: Jun. 10, 1986

[54] PORTABLE BALANCED MOTION COMPENSATED LIFT APPARATUS

[75] Inventors: Donald J. Hackman, Upper Arlington; Don W. Caudy, Sunbury; Leslie F. Nikodem, Westerville, all of Ohio

[73] Assignee: Battelle Memorial Institute, Columbus, Ohio

[21] Appl. No.: 626,009

[22] Filed: Jun. 29, 1984

[51] Int. Cl.[4] .......................... B66D 1/52; B66D 3/06; B65G 67/58

[52] U.S. Cl. ........................................ 254/277; 91/350; 254/900; 414/138

[58] Field of Search ........................ 254/277, 392, 900; 414/138, 139; 60/413, 415; 91/350

[56] References Cited

U.S. PATENT DOCUMENTS

| | | | |
|---|---|---|---|
| 3,314,657 | 4/1967 | Prud'Homme et al. | 254/392 |
| 3,343,810 | 9/1967 | Parnell | 254/900 |
| 3,912,227 | 10/1975 | Meeker et al. | 254/277 |
| 4,025,055 | 5/1977 | Strolenberg | 254/900 |
| 4,236,695 | 12/1980 | Morrison | 254/277 |
| 4,395,178 | 7/1983 | MacDonell et al. | 414/138 |

*Primary Examiner*—Billy S. Taylor
*Attorney, Agent, or Firm*—Klaus H. Wiesmann

[57] ABSTRACT

A motion compensating device that is installed on a lift line between a crane and an object to be lifted. The device limits dynamic loads on the line by taking up and letting out line by preventing the lift line from going slack and by lengthening acceleration time. The device consists of a hydraulic system and sheave mechanical system arranged in combination together with a balancing system for a given load range. The device is balanced for a given load range to provide a full range of compensation while hanging free. Balance is provided by offsetting a load line a calculated distance Y from a vertical line drawn through a lift point. This offset compensates for turning moments of the apparatus.

4 Claims, 4 Drawing Figures

PORTABLE BALANCED MOTION COMPENSATED LIFT APPARATUS

STATEMENT OF GOVERNMENTAL INTEREST

The invention described herein may be manufactured and used by or for the U.S. Government for governmental purposes without the payment of any royalty thereon.

FIELD OF THE INVENTION

This invention relates to hoisting mechanisms for marine or other uses where there is relative movement between a crane and a cargo to be lifted. The problem may arise in three ways in that the crane may be stationary and the cargo is moving, the crane is moving and the lifted item is moving or both are moving simultaneously as when a ship at sea is lifting something from another ship at sea or from the sea itself. Of course even when both are fixed a binding or quick movement may cause suddenly increased loads. The invention has utility in reducing loads imposed on the crane and cable used to lift the cargo.

DESCRIPTION OF THE PRIOR ART

During a search of the prior art U.S. patents were located that relate to motion compensating apparatus for lifting loads when the lifting cable and the cargo to be lifted are moving relative to each other in a vertical direction. These U.S. patents are:

| | |
|---|---|
| 3,314,657 | 4,236,695 |
| 3,512,657 | 4,448,396 |
| 3,946,559 | |

These patents, particularly U.S. Pat. Nos. 3,512,657 to Chambers and 4,448,396 to Delago are good references for a discussion of the problems associated with lifting cargo in a marine environment. However, none of the prior art found solves the problem in the manner of the present invention.

BACKGROUND OF THE INVENTION

The sea constitutes a dynamic environment that imparts dynamic loads on hoisting cables unlike those imparted in a land-based operation. In particular, the at-sea environment can significantly decrease the safety factor of the lifting line. This is particularly true when the sea generated effects of roll, pitch and yaw cause the line of non-motion compensated lifting equipment to go slack for an instant, followed by a sudden dynamic loading. This situation, a condition called "snap loading", is a major cause of lift line failure because the stress in the line can be many times that due to the static weight of the object being lifted.

In addition to lifting a load with a crane where the load and crane are mounted on separate platforms moving relative to each other, it may be necessary to lift objects in or floating on the sea. Further, launch and recovery operations of boats, sea planes or other items may be needed. In recovery operations the objects to be lifted may be flooded with water further temporarily raising the load levels to the line and crane.

Launch and recovery operations are presently accomplished using a host ship's crane, connected directly to the object to be lifted. High loads and jerks (snap loading) on the lifting line due to the relative movement between the crane boom and the object can cause damage to the ship's crane, lift line, and/or the lifted object.

One method of reducing this snap loading is to install a motion compensating device in the rope between the crane and the object to be lifted. This motion compensating device will limit the maximum tension by taking up and letting out of line. The motion compensating device assists by placing "give" into the system. The motion compensating device is essentially a large air spring which accommodates crane boom tip movement without snap loading. This is because the motion compensating device will not allow the load lift line to go slack during operation. The load line is taken up by the motion compensating device as the boom moves down. Conversely as the boom moves up, the motion compensating device can give out load line as its hydraulic cylinder compresses the gas in the accumulator like a spring. This compressed gas can then extend the ram and take up load line as load is decreasing. An added feature of using a motion compensating device is that since the lift system is now soft due to the takeup and give out of load line in the motion compensating device, the object to be lifted will not be moved nearly so vigorously in the water by the motion from the crane boom with respect to the water surface. Thus, use of a motion compensating device will provide a much steadier platform of the lifted object for access by swimmers in recovery operations.

Because the motion compensating device minimizes dynamic loads on the lift line, design factors of safety can be reduced somewhat from conventional practice. Prior to the development of motion compensating devices, designers were forced to utilize very high factors of safety in developing lifting equipment for use at sea to assure that a lift line would not part should it undergo a series of snap loading cycles. For example, conventional design practice would dictate applying a six to one safety factor on the fully flooded weight of a recovery operation at sea in designing lift equipment. However, with the use of a properly designed motion compensating device, not only is the possibility of snap loading virtually eliminated, the motion compensating device assures that the object lifted from the water is lifted slowly enough that the lift system never even sees a fully flooded object.

The possibility of snap loading is eliminated through two means, first by preventing the lift line from going slack and second by lengthening the acceleration time and therefore lowering the peak loads in the line. As a typical case consider that the object is supported by the motion compensating device and the boom tip moves up suddenly. As the boom tip moves upward, it applies a slightly greater load to the object through the motion compensating device. The motion compensating device seeing this greater load reacts by compressing the gas in the accumulator and paying out wire rope to the load. The object in turn seeing this greater load will start to accelerate to the boom tip velocity. This acceleration to boom tip velocity will take time and the compensator will have compressed some distance during this time. The amount of time or compression distance that this acceleration takes can be controlled by changing the size of the accumulator of the motion compensating device. Ultimately, the difference between using a motion compensating device versus not using a motion compensating device during lifting, deployment, launch and recovery operations through the air/water interface, is that the acceleration time on the payload is an order of magnitude different in favor of using the motion compensating device.

An object of the invention is to provide a portable balanced motion compensating apparatus for use in raising and lowering loads in a marine environment.

Another object of the present invention is to provide a portable balanced motion compensating apparatus small enough and light enough to suspend from existing cranes.

Another object of the invention is to provide an apparatus that eliminates snap loading caused by crane boom and load relative movement in a marine environment.

A further object of the invention is to provide an apparatus that would be simple to operate.

Various other objects, features and advantages of the invention will be apparent in the following drawings and description of the invention.

BRIEF DESCRIPTION OF THE INVENTION

The portable balanced motion compensated lift apparatus can be attached to a crane hook and immediately provide motion compensation, snap protection, and overload protection. The device is balanced for a given load range to provide a full range of compensation while hanging free. It would be mounted between the boom of the hoisting mechanism and the load to be lifted.

The device consists of a hydraulic system and sheave mechanical system arrangement together with a balancing system, for a given load range. This in combination provides the above-mentioned protection.

The hydraulic system basically consists of a ram, ram cylinder, and air-oil accumulator. The ram cylinder's hydraulic system is connected, to the bottom (oil side) of the air-oil accumulator. A free floating piston in the accumulator separates the oil from the air side of the system. An energy source is provided by high pressure air that is stored in flasks, and piped to the air-side of the accumulator.

The right and left ram sheave assemblies constitute the mechanical system. The rope reeved through these sheaves, combined with the area of the ram provide a ratio of line tension to air pressure.

The ram begins travel at the midpoint position with the load attached. This is the position the operator tries to maintain. As the line tension increases, the force produced overcomes the force directed from the air pressure side of the accumulator, and allows the ram to retract.

The fluid of the ram cylinder that is displaced by the descending ram passes to the oil side of the accumulator. This fluid exerts a force on the bottom side of the free floating piston, and causes the air to compress. The ram will continue retracting until the force exerted on the ram is equal to the force acting on the air side of the accumulator.

When the line tension in the rope decreases, an opposite action takes place. The decrease causes less force on the oil side of the accumulator than the force on the air side. This causes the accumulator piston to extend, forcing the fluid from the accumulator to the ram cylinder. The fluid acting on the ram causes it to extend and hauls in rope until the forces are once again balanced.

The device is also effective in lowering objects in the water and can be submerged in water. The balanced motion compensated device may be removed from the system once its use is completed.

As the balanced motion compensated device is operating, the rod of the ram moves back and forth along its axis. The relative movement of the ram and all the components attached to it changes the center of mass of the motion compensating device. This motion of the center of mass was compensated for, by calculating where the center of mass would be as a function of rod displacement and adjusting by off-setting the hang point (crane side) and lift line. This is possible because when the center of mass moves away from the hang point as the ram compressed, the increasing tipping moment is countered by the offset distance to the lift line which creates an increasing counter moment as lift line load increases.

BRIEF DESCRIPTION OF THE DRAWINGS

In FIG. 1 the balanced motion lift apparatus 100 is shown in use, which hereafter will be referred to also as the apparatus. The apparatus is connected to the crane lift line 101 of a crane 102 at its lift point attachment 103. The load line 104 is connected to a load at load line connection means 106. The load 105 can be lifted from a platform 107 moving relative to the crane 102 or directly from the sea 108. FIG. 1 further illustrates the horizontal positioning of the apparatus 100 when in operation. The hydraulic ram 109 contains a hydraulic cylinder 200 (FIG. 2) within the ram 109 and a hydraulic piston 110 that extends and retracts in the horizontal direction. First sheave means 120 is mounted to one end of the hydraulic ram or cylinder 109. Second sheave 121 means are mounted on the free end of the hydraulic piston 110. Third sheave means 122 mounted at the hydraulic cylinder and offset from the center line of the lift point attachment 103 by a distance Y.

FIG. 2 shows the operative relationship between hydraulic ram 109, sheave means 120, 121, 122 and load line means for one embodiment of the invention. A hydraulic means or in this embodiment hydraulic ram 109 having a hydraulic cylinder 200 with the hydraulic piston 110 slideably fitted therein and having a free end 201 that extends from the cylinder 200 provides horizontal compensating movements $(Y_D)/4$ in response to vertical load movements $Y_D$.

Figure 1:
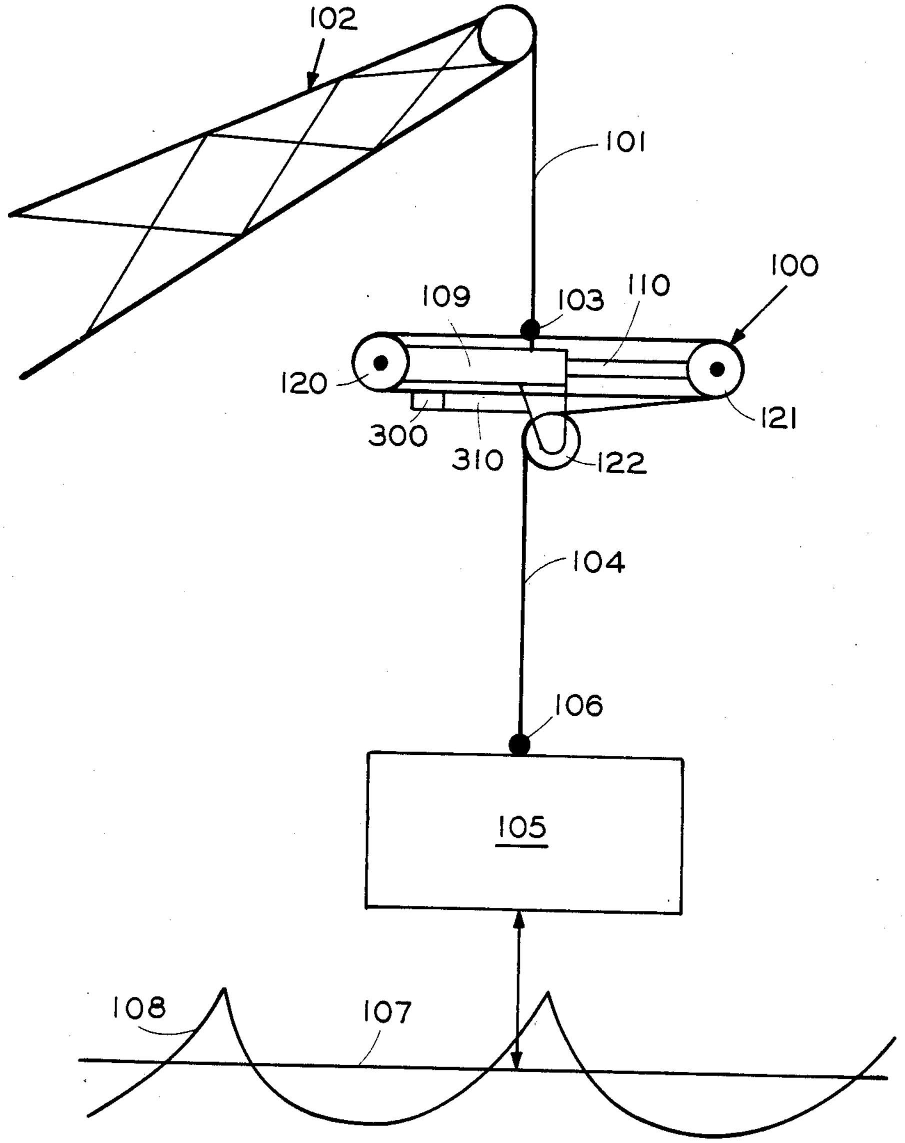
FIG. 1 illustrates, in semischematic form, the use of the apparatus with a crane and load.
Figure 2:
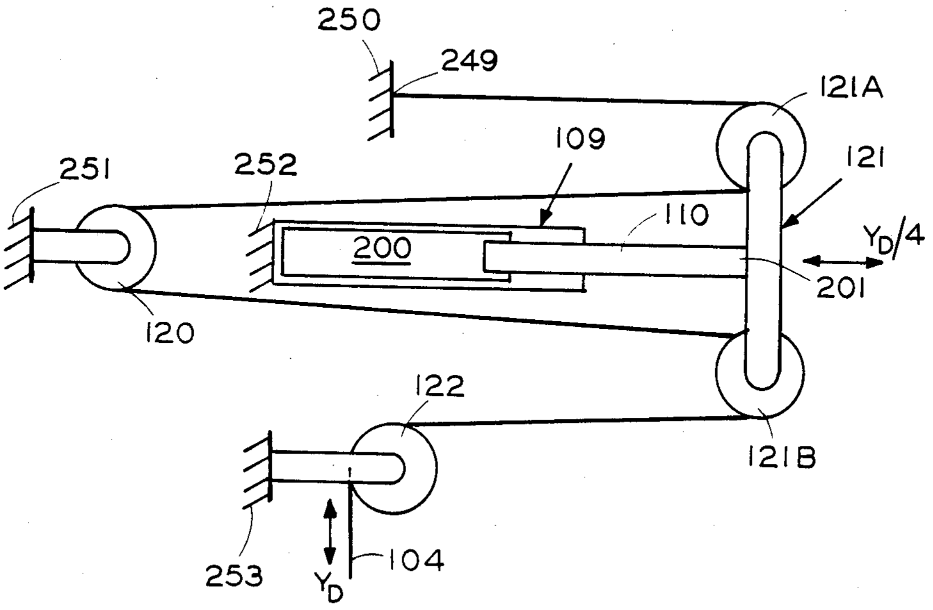
FIG. 2 illustrates in semischematic form the placement of line, sheaves, and ram; and relative movement thereof during compensating action by the invention. The sheaves are shown as sheave means 120,121, and 122. Sheave means 121 is illustrated as two sheaves 121A,121B.

A plurality of mechanical sheaves 120, 121, 122, in this case four, are mounted to the hydraulic means. Four mounting points 250, 251, 252, 253 are depicted and may be all common to the ram 200 but at different locations thereon. First load line end 249 may be terminated at ram 200. A first sheave means 120 is mounted at the extreme end of the ram 109. A second sheave means 121 mounted at the free end of the piston 201 is actually two sheaves 121A and 121B. A final sheave 122 is also mounted on the ram 109 but so as to aid in balancing the apparatus as explained in detail below. This embodiment requires the piston 110 to move only one-fourth (¼) the distance that the load moves to fully compensate. Other arrangements of a plurality of sheaves are possible to alter the distance that the piston 110 must move to compensate for load movements and can be easily determined by those skilled in the art. For example a total of six sheaves could be used to reduce required piston movement to one-sixth (1/6).

Figure 3:
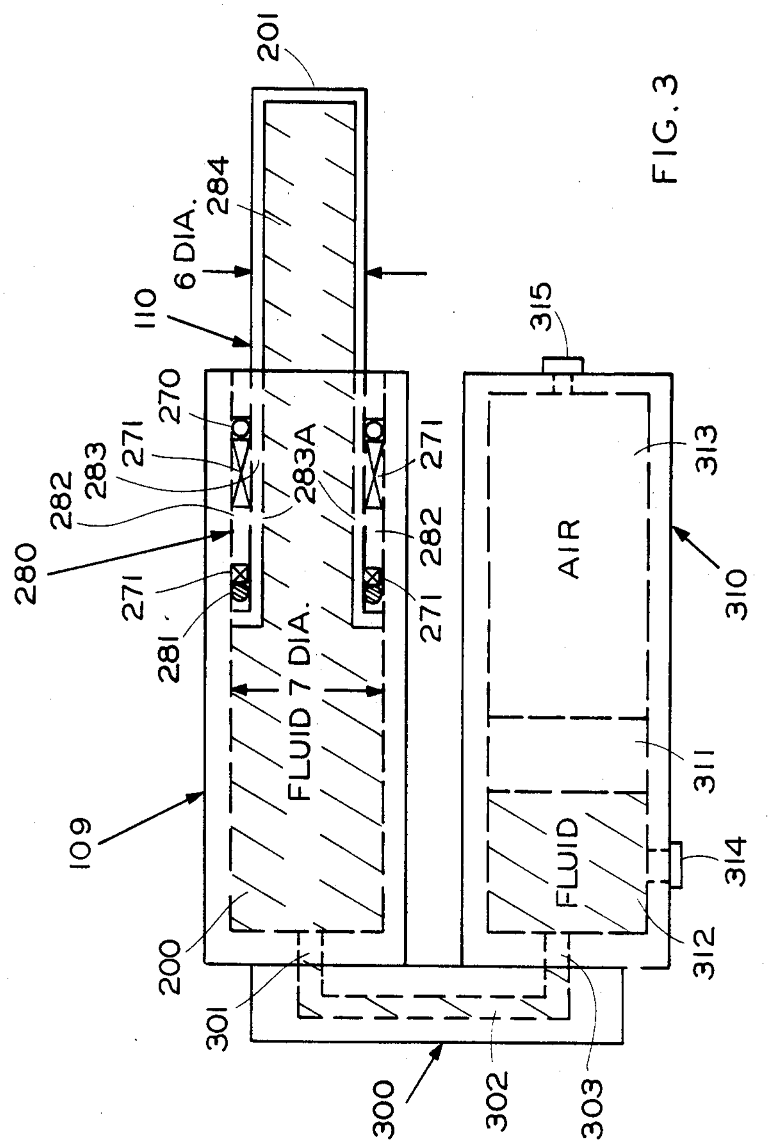
FIG. 3 illustrates in semischematic form further details of the ram and accumulator portion of the invention.

In FIG. 3 greater details of the hydraulic means or system are shown. Ram 109 comprises a hydraulic cylinder 200 and hydraulic piston 110 with a free end 201 projecting from the cylinder 200. In addition sealing means 270 and bearing seals 271 may be used to prevent leakage and allow longer service life.

A cushioning means 280 may be provided as discussed below to prevent damage should the line 104 snap or the load drop.

A hydraulic manifold 300 is operatively connected to the hydraulic ram 109. A hydraulic accumulator 310 is operatively connected to the manifold 300. Hydraulic cylinder port 301, manifold line 302 and accumulator port 303 allow hydraulic fluid flow between the ram 109 and accumulator 310.

A free moving accumulator piston 311 separates the hydraulic fluid 312 from the gas side 313 of the accumulator 310. Valves 314 and 315 may be used to drain or fill the accumulator with hydraulic fluid or gas respectively.

Figure 4:
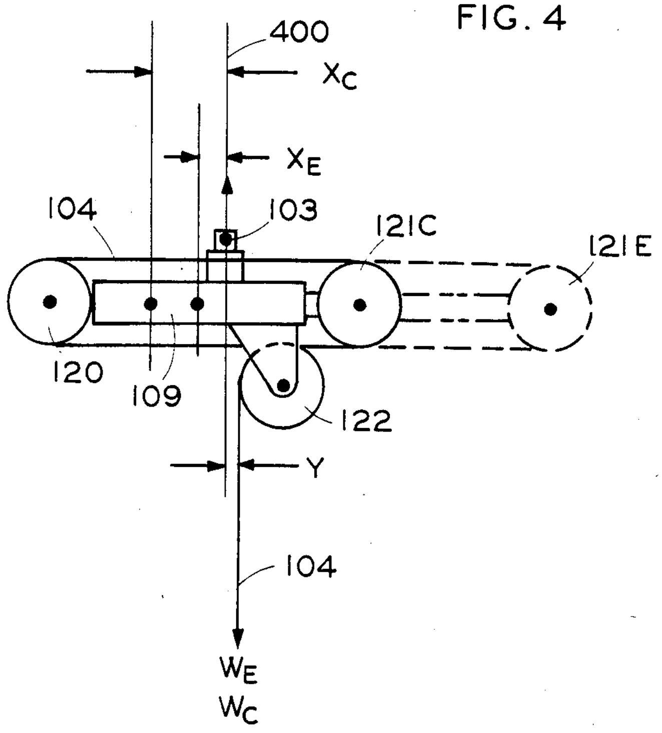
FIG. 4 illustrates in semischematic form the balancing features of the invention.

FIG. 4 illustrates the balancing concept of the invention. This balancing concept depends on the interrelationship of the hydraulic means, mechanical sheave means lift point and load line.

In general, the invention is a balanced motion compensated lift apparatus comprising hydraulic means adapted to provide compensating movements in response to load movements, a plurality of mechanical sheave means operatively mounted on the hydraulic means, load line means operatively mounted to the sheave means and terminating at a load connection means 106, and balancing means in operative interrelationship with the above means so as to balance the apparatus. The balancing means are further defined by the following formulas that locate the horizontal offset distance of the load line Y from a vertical line drawn through the lift point.

$$M_E = X_E(W) - Y\,(W_E) \quad (1)$$

$$M_C = X_C(W) - Y\,(W_C) \quad (2)$$

Where:

- $M_E$=moment unbalance for lightest load
- $M_C$=moment unbalance for heaviest load
- $X_E$=distance that center of mass is from a lift point under the lightest load
- $X_C$=distance that center of mass is from the lift point under the heaviest load
- W=weight of the apparatus
- $W_E$=weight of lightest load
- $W_C$=weight of heaviest load
- Y=offset distance, distance that the load line is set off from the lift point.

and Y is picked so that $M_E$ and $M_C$ are at a minimum.

Equations 1 and 2 are solved for two situations. The first for heaviest load $W_E$ and the second for the lightest load $W_C$. For $W_E$ sheave 121 would be at position 121E and for $W_C$ at 121C. Correspondingly the center of masses for these two situations are $X_E$ and $X_C$. Given the weight of the apparatus W, Y can then be changed until $M_E$ and $M_C$ are at a minimum. This will allow balanced operation of the apparatus.

While it is recognized that in general $M_E$ and $M_C$ may not need to be at their absolute minimum, (but only small enough to give stability) it is preferred that they be at the minimum since this gives greatest stability.

As the apparatus is operating, the piston 110 of the ram 109 moves back and forth along its axis. This relative movement of the ram 109 and all the components attached to it changes the center of mass of the apparatus. This motion of the center of mass was compensated for, by calculating where the center of mass would be as a function of piston displacement and adjusting by offsetting the lift point (crane side) and load line 104 as shown in FIG. 4. This is possible because when center of mass moves away from the hang point as the piston is compressed, the increasing tipping moment is countered by the offset distance, Y, to the load line 104 which creates an increasing counter moment as load line 104 load increases. The vertical line 400 through the lift point is used to calculate Y for the load line.

The hydraulic accumulator 310 is the storage mechanism of the apparatus. While the apparatus is being compressed by the upward movement of the crane boom the hydraulic ram 109 moves fluid into the hydraulic accumulator 310. The fluid movement forces the piston 311 towards the air valve 315 reducing the volume of the air and hence increasing its pressure. When the crane boom upward movement is over and it starts to move downward, the accumulator uses the higher pressure from compression to drive fluid back to the ram which in turn extends and holds tension on the rope.

In operation, an air to oil piston type accumulator 310 is connected to a ram type hydraulic cylinder 109. The air side of the accumulator 313 is pressurized to a predetermined value based on accumulator air volume and load weight. This air pressure is transmitted to the oil side of the accumulator 313 and from the accumulator 310 to the hydraulic cylinder 200 by means of a manifold line 302. The hydraulic cylinder 200 will then be pressurized to the accumulator air pressure. This pressure will exert a force on the piston 110 and it will be balanced against the load to be picked up. If the load on the piston 110 increases, the piston starts to retract forcing the oil out of the cylinder 200 via the manifold connection 302 into the accumulator 310. The accumulator 310 begins to fill with oil thereby reducing the air volume 313. This reduction in air volume 313 causes the air pressure to increase to a value that will balance the new load weight. At this point the piston 311 will stop moving and remain in equilibrium until the external load changes. A decrease in the load on the piston 110 will reverse the process and allow the piston 110 to extend. This will cause the oil in the accumulator 310 to flow to the cylinder 200. As the oil volume in the accumulator 310 decreases, the air volume increases and the air and hydraulic pressure goes down until the pressure in the ram is balanced against the load pressure.

If for any reason, the motion of the load line 104 is such that the piston 110 will be fully extended, the load line 104 will go slack and any velocity on the ram 109 will have to be stopped by impact on the physical stop 281 in the ram 109. In order to avoid this situation a cushion 280 was built into the ram 109 to use as a decelerating device. The cushion 280 operates by restricting the flow of fluid from the annular ring area 282 to the ram piston area at the end of the ram stroke. This is accomplished by using holes 283 to pass fluid from the annular ring area 282 to the piston area 284. As the ram 109 moves to its end of stroke, the holes 283 are closed off requiring all the fluid to pass through smaller diameter appertures 283A as the holes 283 are closed. This in turn allows a higher pressure on the annular ring area 282 which provides the deceleration force. The cushions 280 were sized to provide smooth cushioning with a hypothetical rope breakage and a 1000 psi precharge to the air side of the accumulator.

The hydraulic ram 109 converts the pressurized fluid in the accumulator into a force on the rope. Because there are four parts of the load line 104 on the hydraulic ram's piston 110, the load on the ram is four times the lifting load, and the displacement on the ram is one-fourth ($\frac{1}{4}$) the load displacement. On the prototype motion compensating device, the inside diameter of the ram was 7 inches but the annular 282 and main areas of the ram are connected by holes 283. Thus, the effective area of the ram is that of the piston diameter of 6 inches (28.26 in.$^2$). The fluid passage holes between the annular area and the rod are sized to only cause small flow pressure losses during normal operation.

The apparatus built according to the invention was designed to lift a static load of 18,000 pounds. A total compensating range of 12 feet was obtained but crane boom and/or load displacements of only 10 feet were contemplated in the design. For 18,000 pounds, a 6 gallon accumulator volume and a accumulator gas precharge pressure of 500 psi was preferred. This gave good compensation in sea water tests.

The apparatus was hung from an overhead crane with its active end attached to the test rig by passing under a snatch block. The angle which the compensator makes with the horizontal was measured with no load. The test rig was then used to pull the apparatus. The amount of tipping with respect to horizontal was measured under a variety of loads. The maximum angle of tip was from +5° at no load to −6° at full load that caused 10 foot extension of the hydraulic piston. The dynamics of tipping was also visually observed for a variety of loads and test rig speeds. In addition, the apparatus was observed while it was cycled between a slack and a tensioned condition. There were no cases where the dynamic tipping was significantly more than the measured static values. No resonance tipping movement was seen at any of the various speeds.

During the balance check the torque induced by the load on the wire rope was measured. The torque was measured by measuring the load in a tag line. The torque was measured at several wire rope loads. A spring scale was added into the tag line to measure the load. The following table summarizes the results of the testing.

The maximum tag line load (at 17,000 pound load) was 33 pounds. This could be easily held by the tag line. The tag line is normally used when lifting. If preferred it does not need to be used; but, the apparatus will then spin as the load is raised.

Because of load dynamics the apparatus should have a design factor to handle dynamic loads. A design factor of 6:1 was preferred but lower ones may also be used depending on conditions.

All structural components were therefore sized to withstand a maximum rope load of 110,000 pound based upon ultimate strength.

Although the design factor of 6:1 was applied to all structural members, it was not used for the hydraulic loadings since the ram 109 is fully bottomed out prior to reaching the full design loads. The hydraulic ram and accumulator have a 3:1 design factor based upon yield with 3000 psi internal pressure. The fluid pressure at 18,000 pound line load is 2550 psi. This provides a design factor of 3.5:1 on hydraulic pressure. In addition to this, though, there was a hydraulic fluid relief valve (not shown) set at 3500 psi in the system. Thus, even if the system were overfilled with oil and overloaded, the maximum pressure in the ram and accumulator would be limited to 3500 psi.

The overall efficiency of the apparatus depends to a great deal upon the sheave diameter selected for the load line. The larger the diameter of the sheave the easier it is to bend the load line (which is wire rope) around the sheave and the longer the overall life of the wire rope. The most common number associated with sheaves is the sheave to wire rope diameter ratio. A ratio of approximately 20 is considered adequate for normal applications. However, with the apparatus a smaller sheave diameter decreases the weight and the size which are very important for a device to be suspended from a crane-boom. To compromise these competing considerations, the ratio of 16:1 was used for a 1 inch diameter IWRC 6×39 Extra Improved Plow steel wire rope.

In order to estimate the friction losses of the wire rope and sheaves, the equation for multiple part hoisting block was used. For the apparatus, there are a total of four sheaves which leads to a calculated friction of approximately 10% of the line load. Therefore, for a 20,000 pound actual load on the apparatus, compression of the ram 109 would require a 22,000 pound load and expansion would require reducing the load to 18,100 pounds. Both of these values were calculated using roller bearings on the sheave shafts instead of plain sleeve bearings. The friction losses set some lower limit as to the load that would be handled effectively.

To verify the strength of the apparatus, it was loaded up to 26,500 pounds with the piston 110 fully retracted. This is approximately 8500 pounds over the maximum load. This overload value is double the maximum overload transient load which was predicted for 10 foot waves in 5 second periods. There was no observed yielding or damage to the apparatus after the static testing was completed.

A load versus displacement check showed that a 6 gallon accumulator volume is preferred for operation. As expected, the higher the precharge pressure the higher the initial starting load.

The MCD was designed so that it is simple to operate when at sea. There are only two variables which can be changed, the accumulator volume and the precharge pressure. To change the initial precharge, all that is necessary is to attach the gas fill valve to a charge hose with a gas pressure source or simply bleed off gas depending on whether the precharge is to be increased or decreased.

The ideal position of the piston on lifting a load is to be halfway out on its stroke. This will allow maximum compensation in either direction as the load varies dynamically. The operator can adjust the amount of hydraulic fluid in the accumulator or the gas pressure in the accumulator to accomplish this for a given size load. The fluid volume and gas pressures are easily determined by those skilled in the art once the teaching of the invention is known.

These fluid volumes and gas pressures can be static, that is preset at the beginning of use of the device as in the embodiment illustrated herein. An alternative embodiment would be to connect hydraulic fluid supply means and gas pressure supply means to respective valves at the accumulator at the respective valves 314, 315. These supply means could then be dynamically controlled by the operator by radio signals, electrical signals, or other means carried by a tag line to provide optimum compensation.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A balanced motion compensated lift apparatus comprising:

a. a hydraulic ram having a hydraulic cylinder with a hydraulic piston slideably fitted therein and having a free end that extends from the cylinder;

b. a hydraulic manifold operatively connected to the hydraulic cylinder;

c. a hydraulic accumulator operatively connected to the hydraulic manifold so that a fluid can pass between the cylinder and accumulator and having an accumulator cylinder with a free moving piston within the cylinder that separates the fluid in the accumulator from a pressurized gas;

d. a first sheave means mounted to one end of the hydraulic cylinder;

e. a second sheave means mounted to the free end of the hydraulic piston;

f. a lift point attachment at the hydraulic cylinder;

g. a third sheave means mounted at the hydraulic cylinder and offset from a center line of the lift point attachment by a distance Y;

h. load line means operatively mounted on the first, second and third sheave means and terminating at a load line connection means; and i. balancing means of an operatively interrelationship with means a, b, c, d, e, f, g, and h adapted to balance the apparatus, wherein the balancing means are further defined by the following formulas:

$$M_E = X_E(W) - Y(W_E)$$

$$M_C = X_C(W) - Y(W_C)$$

wherein $M_E$ = moment unbalanced for lightest load $M_C$ = moment unbalanced for heaviest load $X_E$ = distance that center of mass is from a lift point under the lightest load $X_C$ = distance that center of mass is from the lift point under the heaviest load W = weight of the apparatus $W_E$ = weight of lightest load $W_C$ = weight of heaviest load Y = offset distance, distance that the load line is set off from the lift point.

and Y is picked so that $M_E$ and $M_C$ are at a minimum.

2. The apparatus as defined in claim 1 further comprising a cushion means operatively mounted to the hydraulic ram adapted to provide deceleration during the last portion of the hydraulic piston stroke.

3. The apparatus as defined in claim 1, wherein the hydraulic piston is adapted to move in a horizontal path.

4. The apparatus as defined in claim 3 further comprising a cushion means operatively mounted to the hydraulic ram adapted to provide deceleration during the last portion of the hydraulic piston stroke.

* * * * *